Nov. 7, 1961     T. R. KORCHAK     3,007,279
SPLITTING SEVERABLE CONSTRUCTION STICK

Filed Sept. 15, 1958     3 Sheets-Sheet 1

INVENTOR.
Thomas R. Korchak
BY
ATTORNEY.

Nov. 7, 1961 T. R. KORCHAK 3,007,279
SPLITTING SEVERABLE CONSTRUCTION STICK
Filed Sept. 15, 1958 3 Sheets-Sheet 2

INVENTOR.
Thomas R. Korchak
BY
ATTORNEY.

Nov. 7, 1961 T. R. KORCHAK 3,007,279
SPLITTING SEVERABLE CONSTRUCTION STICK
Filed Sept. 15, 1958 3 Sheets-Sheet 3

INVENTOR.
Thomas R. Korchak
BY
ATTORNEY.

United States Patent Office 3,007,279
Patented Nov. 7, 1961

3,007,279
SPLITTING SEVERABLE CONSTRUCTION STICK
Thomas R. Korchak, Kansas City, Kans., assignor to The James S. Merritt Company, Kansas City, Mo., a corporation of Missouri
Filed Sept. 15, 1958, Ser. No. 761,246
5 Claims. (Cl. 46—28)

This invention relates to a notched stick construction unit for fabricating toy structures and refers more particularly to a fragmentable notched stick construction unit which is also adapted to be split relative the notched and severable portions thereof to provide a more versatile construction stick.

This invention is an improvement over the construction disclosed in my Patent No. 2,844,910, "Construction Unit and Commodity Mounting," issued July 29, 1958. This application is also a continuation-in-part of my application Serial No. 749,188, filed July 17, 1958, entitled "Construction Unit" and my application Serial No. 749,798, now abandoned, filed July 21, 1958, "Interiorly Double-Notched Fragmentable Construction Stick."

The above issued patent and pending applications have disclosed construction sticks of great versatility in that the entire stick itself may be used as a construction unit or the stick itself may be fragmented into one or more parts, each of which is usable as a construction unit by itself. With such sticks, devices and miniature objects of many and varied types, including vehicles, buildings, furniture, and the like may be assembled. These previous construction units have also been flexible enough in spite of their severability to permit limited deformation into various shapes for fabricating curved structures. Sticks were provided, (1) which, after severance, retained ends of substantially the same shape, (2) included means for permitting indefinite length construction, and (3) wherein a subsegment of the original stick had a critical length ratio relative the original stick permitting quick matching of engaged segments and original sticks. Thus, construction units were provided having a versatility previously undreamed of in the toy industry.

Despite all of the above advantages, it was realized that it would be additionally desirable and provide a further feature of versatility in the above-mentioned construction sticks if it were possible to insert or engage additional sticks into or with already completed constructions made up of the sticks without changing or dismantling the constructions. In such case, continuations of structures could be provided, internal bracing provided where necessary or desired, decorative features added, unused notch ports filled in and the like. It would be particularly desirable if such a feature could be provided in a stick which would not substantially vary in form from the ordinary stick. Such a feature would be even more desirable if it could be employed in either the original unfragmented stick or a severed segment thereof. Finally, it was desired to provide means to uniformly cause and control such splitting with safety to and minimum effort on the part of the operator.

Therefore, an object of the present invention is to provide a notched, severable construction stick which is readily modifiable by splitting portions therefrom to permit more varied engagement of the stick with other like sticks.

Another object of the invention is to provide a notched, severable construction stick which is readily modified by splitting portions therefrom to permit engagement of the stick with already formed constructions of the sticks without dismantling the latter.

Another object of the invention is to provide a notched, severable construction stick wherein the severed segments of the stick are each modifiable by splitting portions therefrom to permit more varied engagement of the stick segments with either like segments or unsevered sticks.

Another object of the invention is to provide a notched, severable construction stick wherein both internal portions of the unsevered stick and internal portions of severed segments therefrom are modifiable by splitting portions therefrom to both permit more varied engagement of the stick with other like sticks and provide openings of many varieties and forms into constructions fabricated with the sticks and segments.

Still another object of the invention is to provide a notched, severable construction stick which is readily modified by splitting portions both from the central and end portions of the stick, the splitting in all cases being readily and precisely accomplished by either or both forming the sticks of a particular type of material or employing split directing means on the stick.

Another object of the invention is to provide a notched, severable, splittable construction stick which is so formed as to itself be the most efficient agent of effecting and controlling a desired split in another stick of like character.

Another object of the invention is to provide a construction unit for use in miniature, play and toy use which can be fabricated in a plurality of forms, each form employable itself as a single construction unit or each fragmentable, all of the fragments resulting interengageable to produce large varieties of miniature and toy constructions or structures and both the original stick and each fragment resulting from every form readily modifiable by splitting portions therefrom to permit more varied engagement of the stick or fragments with other like sticks or fragments.

Still another object of the invention is to provide a construction unit for use in miniature, play and toy applications which is fragmentable or employable alternatively as a single unit, the fragmented portions thereof so formable as to be yet subfragmented if desired to produce still smaller structural units utilizable in the toy construction processes and structures, the original stick, the fragmented portions, and the subfragmented portions all readily modifiable by splitting portions therefrom to permit more varied engagement of the stick, fragmented portions, or subfragmented portions with other like sticks, fragmented portions or subfragmented portions.

Still another object of the invention is to provide a notched, severable construction stick which is readily modified by splitting portions therefrom to permit more varied engagement of the stick with other like sticks, the splitting easily and accurately accomplished, yet the stick of sufficient integrity as to not split under normal building conditions against the desire of the user.

Other and further objects of the invention will appear in the course of the following description thereof.

In the drawings, which form a part of the instant invention and are to be read in conjunction therewith, embodiments of the invention are shown and, in the various views, like numerals are employed to indicate like parts.

FIGS. 1–4, inclusive, illustrate four variations of the splitting feasible on a severable construction stick fabricated according to the instant invention wherein the lines of severance in the stick are not indented where they contact the longitudinal edges of the stick.

Figure 1:
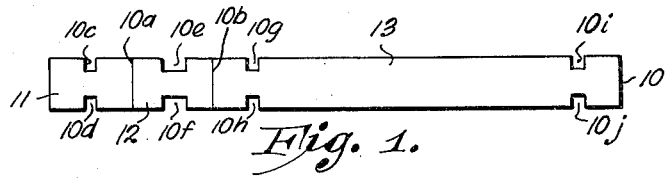
FIG. 1 is a side view of a fragmentable construction stick embodying the instant invention before any splitting of portions of the stick therefrom.

FIGS. 5–8, inclusive, show additional varieties of splitting possible in a construction stick, substantially of the type shown in FIG. 1, but modified in that the lines of severance are substantially inwardly formed where they join the longitudinal edges of the construction stick.

Figure 5:
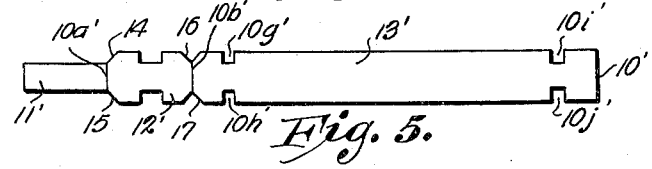

FIG. 5 is a side view of a stick similar to that in FIG. 1 but with inwardly formed lines of severance therein, one end segment next an indented line of severance having the walls of its notch split off.

Figure 6:
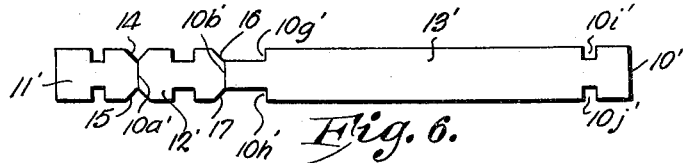

FIG. 6 is a side view of a stick similar to that shown in FIG. 1 but with inwardly formed lines of severance, the walls of one segment between an indented line of severance and a notch in the segment having been split off.

Figure 7:
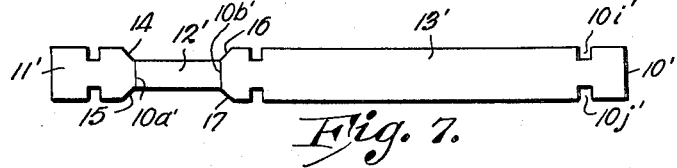

FIG. 7 is a side view of a stick similar to that of FIG. 1, but with inwardly formed lines of severance, wherein an internal severable segment formed by two indented lines of severance has had the walls of its notches split off.

Figure 8:
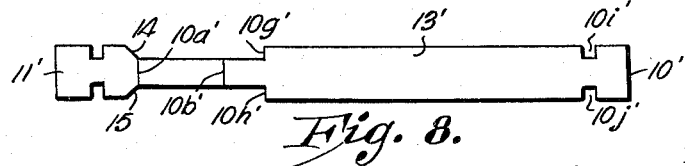

FIG. 8 is a side view of a stick similar to that of FIG. 1, but with inwardly formed lines of severance, wherein splitting according to the showing of both FIGS. 6 and 7 has been accomplished.

FIGS. 9a–9f, inclusive, show various changes possible in a single construction unit having a single pair of notches therein by splitting off one or more walls of one or more notches.

Figure 9A:
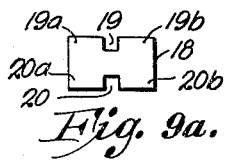

FIG. 9a shows a side view of a miniature construction unit severable from a larger notched construction unit, the small unit having a single set of notches.

Figure 9B:
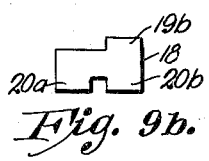

FIG. 9b shows the construction of FIG. 9a with one wall of one notch split away.

Figure 9C:
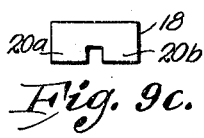

FIG. 9c shows the construction of FIG. 9b after another wall of the same notch is split away.

Figure 9D:
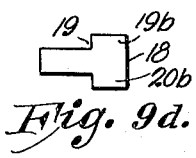

FIG. 9d shows the construction of FIG. 9b after one wall of the opposite notch is split away.

Figure 9E:

FIG. 9e shows the construction of FIG. 9d with a second wall of the first notch split away.

Figure 9F:
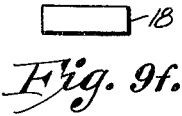

FIG. 9f shows the construction of FIG. 9e with the remaining notch wall split away.

FIGS. 10a–10e, inclusive, show modifications possible to a severed fragment of the construction stick of FIG. 1 having two segments therein with one set of notches in each segment.

Figure 10A:
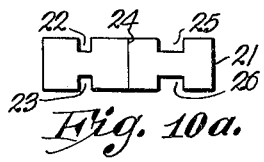

FIG. 10a shows the severed fragment before splitting of any notch walls therefrom.

Figure 10B:
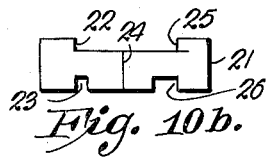

FIG. 10b shows the construction of FIG. 10a with the walls of two adjoining notches split therebetween.

Figure 10C:
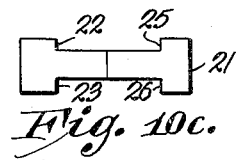

FIG. 10c shows the construction of FIG. 10b with the same procedure applied to the other side of the construction unit.

Figure 10D:
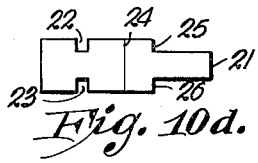

FIG. 10d shows the construction of FIG. 10a after the end walls of the notches of one set have been split away.

Figure 10E:
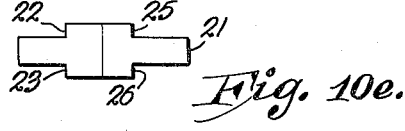

FIG. 10e shows the construction of FIG. 10d after the end walls of the other set of notches have been split away, as well.

Figure 11:
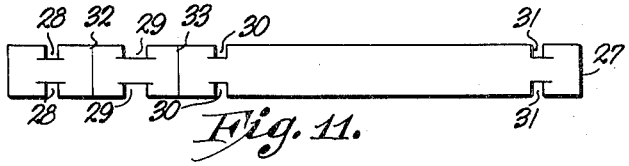

FIG. 11 shows a side view of a notched, severable construction stick embodying a modification of the invention wherein "nick" notches have been formed in the base of each notch extending in a direction in which splitting may be contemplated.

Figure 12:
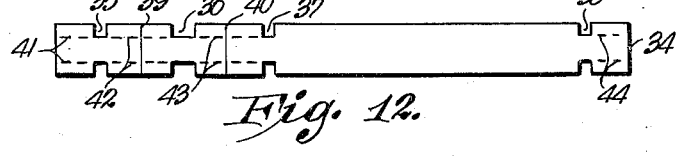

FIG. 12 is a side view of another modification of the invention wherein lines of severance are formed in the walls of notches adjacent the bases thereof in areas of the construction stick in which splitting might be contemplated.

Figure 3:
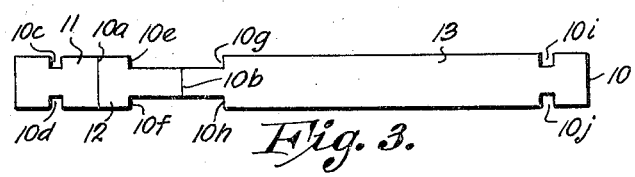
FIG. 3 is a side view of the stick of FIG. 1 wherein two internal portions of the stick have been split therefrom.
Figure 4:
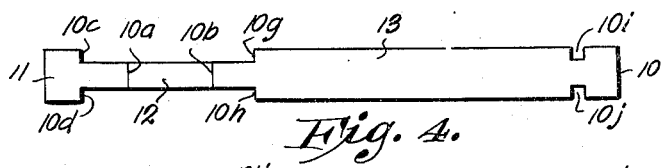
FIG. 4 is a side view of the stick of FIG. 1 wherein four internal portions of the stick have been split therefrom.
Figure 13:
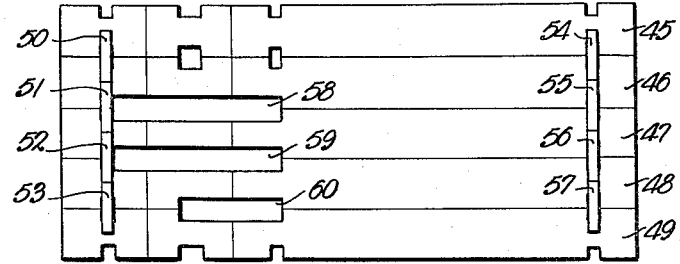

FIG. 13 is a side view of a miniature construction involving a plurality of construction sticks of the form of FIG. 1 which are engaged with one another, some of the sticks modified as in FIG. 3 and others of the sticks modified as in FIG. 4.

Figure 14:
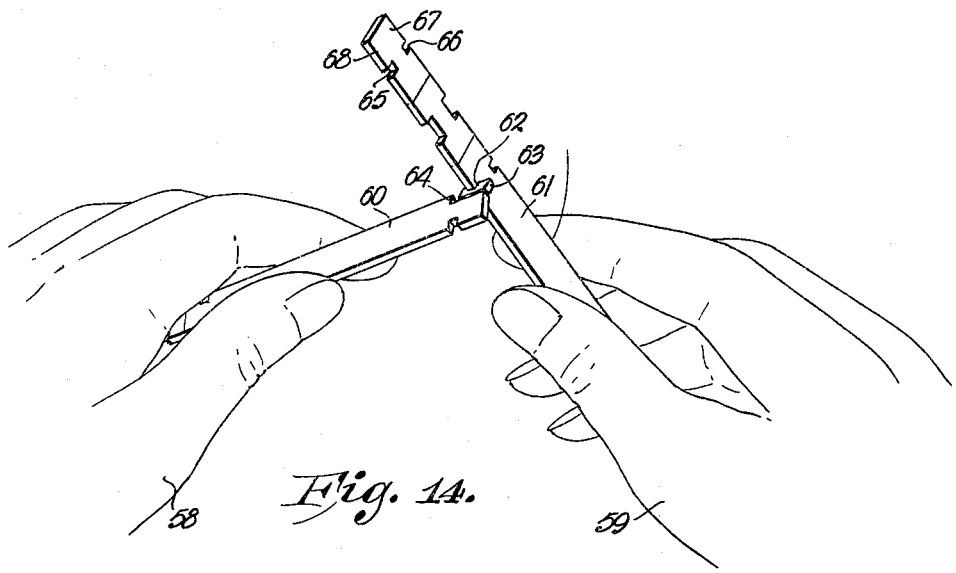

FIG. 14 is a view showing a process of splitting the wall of a notch of a construction stick as in FIG. 1 employing another like construction stick as the split-effecting means.

Figure 15:
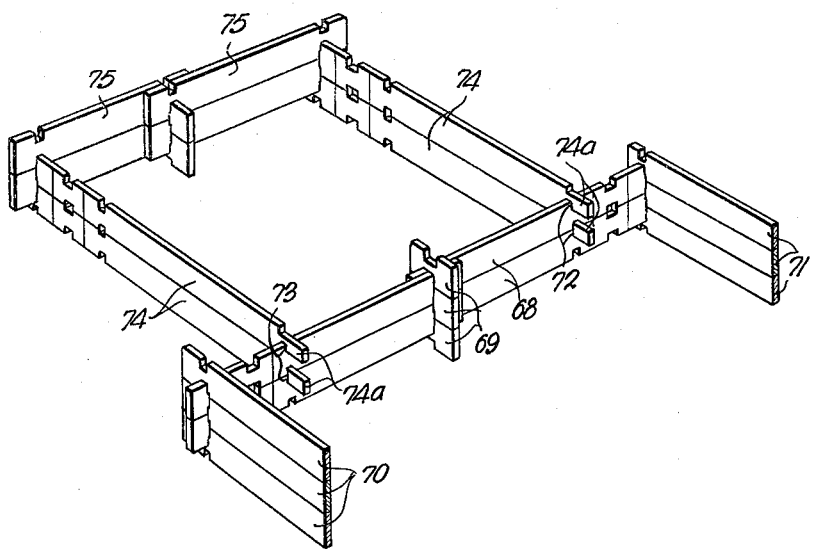

FIG. 15 is a perspective view from above of a miniature construction illustrating the use of "probe" ends on some of the construction sticks provided by splitting of notch walls therefrom.

Referring to the drawings and first to FIGS. 1–4, therein is shown a notched, severable construction stick embodying the invention. Referring to FIG. 1, at 10 is shown the construction stick which comprises (in the modification shown) an elongate body member or element having a plurality of notches spaced along each longitudinal edge thereof and a pair of weakened lines of severance extending transversely of the stick which permit the fragmentation or severing from the construction stick of segments or fragments thereof. The length of the body element 10 is substantially greater than its width and thickness, the width preferably being four times the thickness of the stick. The body element 10 may be formed of wood, laminated paper, plastic, molded wood or any other material which will have the characteristics to be described and also sufficient strength and flexibility to practice the invention. The notches must be at least substantially equal in width (and preferably equal or slightly greater) to the thickness of the body element and in depth preferably equal to one-quarter of the width of the body element.

The lines of severance comprise a groove, a crimp, a furrow, a striation or corrugation or indentation of any suitable type formed across the body element preferably substantially normal to the longitudinal axis thereof. A weakened line of severance is preferably formed into both sides of the body element 10 in symmetrical fashion but may be formed into only side. The weakened line of severance need not be continuous across the body element so long as it permits a fairly even, controllable break. The strength of the body element 10 at a weakened line of severance must not be reduced to the level where the body element 10 will fracture or separate along the line of severance before any sizable application of force or bending moment is applied therto. A properly formed weakened line of severance is one where application of bending force on each side of the line of severance will cause separation only at the line of severance and not in the material therearound, but yet will require a definite segregation of forces applied in that area to cause such fragmentation or separation. The character of the weakened line of severance will necessarily depend somewhat on the character of the material employed to form the body element 10.

While the positioning of the weakened lines of severance, the positioning of the notches and the form of the notches at each position on the body element are not critical to the invention, the construction shown in FIG. 1 is what is called a "universal" stick, in that it may be employed by itself (in sufficient numbers) to fabricate many varieties of complicated miniature constructions. The stick itself severs or fragments to provide five different types of variable length construction units.

Two weakened lines of severance 10a and 10b of the character previously described extend transversely across the body element 10 dividing the body element 10 into at least three segments. The line of severance 10b preferably divides the entire body element into two segments of two "X" length units and five "X" length units, respectively, for the reason disclosed in my application Serial No. 749,188, supra. The line of severance 10a preferably divides the two "X" length segment into two equal parts. Four notches are spaced along each longitudinal edge of the body element 10, distributed as follows: Single-width notches 10c and 10d are centered in the longitudinal edges of segment 11 of body element 10. Double-width notches 10e and 10f are centered in the longitudinal edges of segment 12 of body element 10. Single-width notches 10g and 10h are spaced inwardly in subsegment 13 of body element 10 a distance from line of severance 10b equal to the distance notches 10c and 10d are spaced inwardly from the free end of segment 11. Single-width notches 10i and 10j are spaced inwardly from the free end of segment 13 a distance equal to the distance the notches 10g and 10h are spaced inwardly thereof.

To be able to practice the instant invention in a stick as described, it is necessary that at least limited portions of the stick be formed of such material at least from the base of one notch to (a) the base of an adjoining notch, (b) a line of severance, or (c) an adjoining end of the stick as to permit splitting of the stick along a line at least substantially parallel to the longitudinal axis of the stick from the base of said notch to one of said other points. The changes shown in FIGS. 2, 3 and 4, as made in the stick of FIG. 1 show the splitting modifications which are readily feasible in such a stick and relate only to the splitting from the base of a notch to the base of another notch (whether or not across a line of severance) or from the base of a notch to the end of the stick.

A suitable stick may be formed of either white or yellow birch, the grain of which runs substantially parallel to the longitudinal axis of the stick. Other grain woods may be used, such as American beech, rock maple (hard or sugar maple), gum, aspen, etc. or, indeed, other materials, so long as there is some grain structure, filament structure, or other feature which facilitates splitting of at least the portion of the stick adjacent the bases of the notches along a line parallel to the longitudinal axis of the stick.

The splitting to be described may be accomplished in several ways. Using a white birch stick, for example, the user can split the walls of the notches with his finger, a pair of pliers, or even his teenth. However, by far the easiest method of splitting contemplates the employment of a like notched stick as may be seen in FIG. 14. This figure shows a stick being split precisely in the manner of that contemplated in FIG. 2. Employing a stick of this character wherein the depth of the notches is precisely the depth of the notch walls and wherein the width of the notches is only slightly greater than the thickness of the notch walls, a carefully controlled, entirely accurate, precise break or split may be accomplished as is shown in FIG. 4 to give a completely desirable result. The method of splitting shown in FIG. 14 may be applied to any portion of the stick and to any length split with success.

Figure 2:
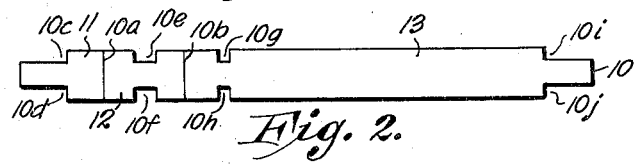
FIG. 2 is a side view of the stick of FIG. 1 wherein four end portions of the stick have been split therefrom.

Referring now to FIGS. 2–4, inclusive, illustrating the variations possible in splitting of the FIG. 1 stick, FIG. 2 shows the construction of FIG. 1 after the outer walls of notches 10c, 10d, 10i and 10j have been split off by an operation as shown in FIG. 14 to provide "probe" type ends. The construction of FIG. 15 (to be described) shows the versatility and usability of such a stick. It is alternatively possible to split off the walls of only notches 10c and 10d, or, alternatively, only the walls of notches 10i and 10j. Only one notch wall need be split off, alternatively, such as the wall of notch 10c. Alternatively, the walls of notches 10c and 10i could be split off. Thus there is considerable variation possible, the splitting being controlled entirely at the will of the operator. The usefulness of the "probe" end sections lies in the fact that the probe ends may be slid into already articulated structures as in FIG. 15 to provide extensions thereon without dismantling the original constructions. Alternatively, once the probe end of the segment 11 in FIG. 2 has outlived its usefulness on the particular entire unit, such a segment may be detached along the line of severance 10a, leaving the fully notched segment 12 as the free end of the original stick. Other evident detachments of split fragmentable portions may be made.

FIG. 3 shows the different construction which is obtainable when the stick 10 is split internally between the inner walls of notches 10e and 10g, and 10f and 10h, respectively. This splitting goes across the line of severance 10b. The entire stick in the form of FIG. 3 is available for use as a plunger or such a stick may be engaged with another, as in the lower two sticks of FIG. 13, to provide a slot or gap therebetween for use in miniature construction as a peep hole, gun slot, port, or the like. Note that this type of splitting leaves, in this particular stick, the two pair of single-width notches 10c and 10d, and 10i and 10j, for interengaging the stick 10 with another like stick to provide a firm construction engagement.

FIG. 4 shows the construction of FIG. 1 after four successive splits wherein the stick has been split from the right-hand wall of the notch of 10g to the left-hand wall of the notch 10c and the same for notches 10h and 10d. This permits the provision of elongate slots as shown in the central engaged sticks of FIG. 13 for use as gun ports, slots, passages, peep holes, and the like in miniature construction. However, while providing the advantage of more elongate slots than in FIG. 3, there is a disadvantage of the lack of a secure engagement in the fragment 11, as the notches 10c and 10d retain only one wall. The splitting crosses both lines of severance 10a and 10b. In making splits of material of greater width than the split from the base of the notch 10c to the outer end of the segment 11, it is advisable to use more than one splitting stick in the manner of FIG. 14, to provide a more uniform, broader grip on the material to be split, exert even pressure therealong and avoid tearing of the material down into the body of the construction unit. This is particularly important in the case of fibrous materials such as wood.

The fragmentable possibilities of the constructions of FIGS. 3 and 4 after splitting should not be ignored, either. If FIG. 3 is severed along the line of severance 10b, segment 13 provides a probe segment of five "X" length unit length, while segments 11 and 12, before severance, one from the other, provide a probe segment of slightly greater length probe. In the severance of FIG. 4, if fragmentation is effected along line 10b, segment 13 then resembles the severable segment of FIG. 3, while the 11 and 12 segment combination has a probe of unusual length. If segments 11 and 12 are severed from one another, one "probe" segment is provided and one "bar" segment, the use of which will be described. The usefulness of a "probe" segment may be seen in FIG. 15 where the probe segments extend past the engaged pieces, to permit further engagement internally of hte pieces engaged, if desired.

It should be pointed out that there are certain materials, including certain woods, that are not properly suitable for ordinary miniature construction work, although they may be splittable. Certain types of very light balsa wood, for example, might split, but also, would have notch walls of such extereme weakness, that the splitting would not be optional at the will of the user. The notch walls must be normally intact under the stress of construction engagement and use, but splittable under proper and sufficient application of force or pressure thereto.

FIGS. 5–8, inclusive, show the different splitting possibilities which arise in a stick of a type shown in FIG. 1 when the lines of severance are inwardly formed of notches substantially in the manner shown in my issued Patent No. 2,844,910, supra. There, however, the inward forming of the lines of severance was coupled with the rounding of the ends of the original construction unit to provide like ends when the fragments were severed, one from the other. In the present instance, independently of whether or not the ends are rounded, it may sometimes be desirable, when employing a splittable material as above described, to inwardly form the lines of severance in substantially V-shaped indentations to a depth preferably not greater than the depth of the notches (one-fourth of the width). In FIGS. 5–8, the lines of severance 10a' and 10b' are inwardly formed where they contact the longitudinal edges of the body element a distance substantially equal to the depth of the notches. All the parts of the sticks of FIGS. 5–8, inclusive, which are identical to the sticks of FIGS. 1–4, inclusive, are numbered the same, except primed. The indents on the line of severance 10a′ are indicated at 14 and 15, respectively, and the indents on the line of severance 10b′ at 16 and 17, respectively. The provision of the indents permits the splitting from the notch walls to a line of severance and not only from wall to wall of the notches.

In FIG. 5, both walls of notches 10c′ and 10d′ have been split out to the line of severance 10a. This permits the use of the entire 11′ segment as a probe from the whole unit or a severable bar segment 11′ to be used as described.

FIG. 6 shows the option of splitting the walls of the notches 10g and 10h to the line of severance 10b′, which permits a severance to provide a five "X" length probe segment or a limited slot or opening at a desired point. The provision of split portions like in FIGS. 3, 4 and 6 permits the engagement of a plurality of other sticks at that point, if desired.

FIG. 7 shows the option of splitting out the walls of the notches 10e′ and 10f′ to the lines of severance 10a′ and 10b′. This is a useful option in that a single-width notch engagement is provided at each end of the entire construction stick somewhat as in FIG. 3, but with the port in a different position along the stick.

FIG. 8 shows the option of splitting from the line of severance 10a′ to the wall of the notches 10g and 10h to provide a longer space than either FIGS. 3 or 7, yet with the desirable single notch engagement remaining at both ends of the construction stick.

Any of the splitting possibilities of FIGS. 1–4 may be also employed in the sticks of FIGS. 5–8, inclusive.

FIGS. 9a–9f, inclusive, show modifications possible to a fragmented-off segment (as segment 11 of FIG. 1) provided that the walls of the notches, at least, are of a material which permits the splitting previously described. Commencing with segment 18 having notches 19 and 20 therein defined by notch walls 19a, 19b, 20a and 20b, the FIGS. 9b–9f show the possible modification thereto.

In FIG. 9b, notch wall 19a has been split off. This construction is useful, for example, if it is desired to have two sticks engage the upper portion of segment 18, with only one engaging the lower notch 20, as in house gables or windows. Notch wall 19b provides some support and positioning.

In FIG. 9c, notch walls 19a and 19b have both been split off to provide a piece which is useful for many types of engagement, particularly, a single stick below and one or more sticks above, again in gables and windows and also continuations of structures, interrupted continuations of structures, and the like.

FIG. 9d shows a construction wherein the notch walls 19a and 20a have been split off to show a piece which is eminently usable as a filler piece, a plug piece, or a probe which inserts into a preformed structure and also is engageable on the other side thereof.

FIG. 9e shows the structure of FIG. 9a with only notch wall 20b remaining, this piece useful as a plug, a probe, and other applications, particularly where there is a single engagement below and a double or multiple engagement above, or vice versa.

FIG. 9f shows segment 18 with all notch walls snapped off, this piece insertable as a plug, a filler, or a piece which is engageable on both sides of a preformed construction, or only one side thereof.

The use of a notched stick to split off the notch walls as in FIG. 14 is almost mandatory in as small a segment as FIG. 9a to obtain a precise break which is controllable relative the rest of the segment in ordinary usable woods.

FIGS. 10a–10e, illustrate the splitting possibilities of the structure provided by severing or fragmenting stick 10 of FIG. 1 along the line of severance 10b only. This produces a very useful piece designated at 21 having single notches 22 and 23 in one segment defined by line of severance 24 with double-width notches 25 and 26 in the other segment.

FIG. 10b shows the resultant structure when the walls of notches 22 and 25 therebetween are split out.

FIG. 10c shows a further change in the figure of 10b wherein the walls of the notches 23 and 26 therebetween are also split out. This piece may be used as a plunger or to produce various types of reciprocating motion in constructions, and the like.

FIG. 10d illustrates a modification of the entire piece wherein the walls of the notches 25 and 26 are split to the end of that particular segment, resulting in a probe piece which has a single notch engaging unit thereon. This is a useful piece in various types of added-on structures and permits clearing and by-passing of end engagements and corners of structures whereby to permit building out to the side thereof.

The split structures shown are optional possibilities of a particular notched, severable construction stick with the splitting capability or capacity. Other severable construction sticks of the varied types shown in my prior patent and applications could be employed to practice the invention, if made of the critical splittable type of material. The sticks may be used in their original form as long as desired, and only changed by controlled splitting when a particular exigency demands, requires or needs a splitting to meet a peculiar circumstance. This makes the original construction stick formed of proper material of great versatility.

FIG. 11 is a construction stick identical to that of FIG. 1 with the exception that "nick" notches or "nicks" have been made in the bases of the notches in directions in which it is contemplated splitting may be effected. This alternative may be taken in materials which have a tendency to shred or tear instead as in certain woods or in other materials which do not readily split whereby to direct and leave the severance. Stick 27 has sets of notches 28, 29, 30 and 31 separated by lines of severance 32 and 33. Sets 28 and 29 have nick notches or nicks running in two directions, as it is contemplated that both walls of these notches may be split out. Sets 30 and 31 have nicks going in only one direction, as it is not contemplated or desired to split between the sets 30 and 31. Such a greatly elongate split as would be made between sets 30 and 31 can often be accomplished, provided pluralities of splitting sticks are used to split in the manner of FIG. 14. However, it is usually preferable to notch the interior of the stick edges more to give greater splitting versatility, rather than to attempt to split over too great a distance. The type of material employed usually determines the effective length of splitting. It is also usually desirable to leave single-width notches on the end of a stick or fragment to provide an engagement, if possible, as in the manner of FIGS. 8, 7, 6 and 3.

FIG. 12 shows a modification of the stick construction of FIG. 1, with the difference that additional weakened lines of severance are provided in the notch walls extending between the notches and the ends of the stick in the walls desired to be ultimately split or anticipated ultimately to be split. Such lines of severance are of the character previously described relative the transverse lines but in the case of a grained wood or the like, running in the direction of the longitudinal axis of the stick, they need not be as deep as the transverse lines. Lines of severance in this manner may be employed in difficult splitting materials and non-splitting materials, such as plastic, to provide sufficiently weakened areas to permit the splitting. Thus stick 34 has sets of notches 35, 36, 37 and 38, with lines of severance 39 and 40. Sets of lines of severance 41, 42, 43 and 44 are provided to permit splitting between the ends of the notches and sets 35 and 38, and for splitting between sets 35 and 36, 36 and 37, and 35 and 37.

FIG. 13 shows a plurality of sticks 45–57, inclusive, engaged at right angles to two other sets of sticks, 50–53, inclusive, and 54–57, inclusive, to form a miniature construction, portions of the sticks split away in the manner shown in FIGS. 4 and 3 to provide ports, slots, and the like, in the miniature construction. Sticks 45, 46, 47, 48 and 49 are engaged at their ends by like sticks 50–53, inclusive, and at their other end by sticks 54–57, inclusive. Elongate slots 58 and 59 are provided between sticks 46 and 47 and 47 and 48, while lesser slot or port 60 is provided between sticks 48 and 49. Stick 47 is split exactly like the stick of FIG. 4, the lower portion of stick 46 also like thereto, the upper portion of stick 48 like thereto, and the lower portion of stick 48 like the stick of FIG. 3. The upper portion of stick 49 is split like the upper portion of the stick of FIG. 3.

FIG. 14 has already been described wherein the operator's hands 58 and 59 hold sticks 60 and 61, respectively. A single-width notch 62 has engaged and broken off (by a clockwise movement of stick 61), the notch wall 63 of notch 64 of stick 60. It is preferred that the user employ notch 62 of stick 61 rather than either notch 65 or 66 thereof, as the walls 67 and 68 of these notches would be relatively vulnerable to the stress applied in the splitting procedure.

FIG. 15 has already been briefly noted. In this construction, four sticks 68 identical in type to the stick of FIG. 1 have been engaged, one with the other, in two pairs to provide a wall. Segments 69 equivalent to segment 12 in FIG. 1 engage the common ends of the sticks as at 69. Other sticks 70 and 71 like sticks 68 make up side walls 70 and 71. Notch slots 72 and 73 are provided in the rear wall which are normally not filled. If it is desired to build on an addition as shown in FIG. 15, sticks 74 like that of FIG. 2 or that of FIG. 1 with the walls of notches 10i and 10j broken off to provide probes 74a thereon may be employed with the probes 74a sliding into the notch slots 72 without any disengagement whatsoever of the pieces 69 or the wall members 68. Segments 75 similar to segments 13 of FIG. 1 engage the other ends of sticks 74. While only a rudimentary structure is shown in FIG. 15, an entire ten or more unit high addition structure could be engaged with a like finished structure in the same manner, thus saving a great amount of labor and dismantling and making more interesting and enjoyable the construction possibilities of the stick.

From the foregoing it will be seen that this invention is one well adapted to attain all of the ends and objects hereinabove set forth, together with other advantages which are obvious and which are inherent to the structure.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described my invention, I claim:

1. In a stick construction comprising a three-dimensional elongate body element having a length greater than its width and thickness, said body element also of substantially rectangular shape whereby to have at least substantially parallel longitudinal edges, at least one weakened line of severance extending across the width of the body element at least substantially at right angles to its longitudinal axis, thereby defining at least two segments of the body element, and at least one notch in each longitudinal edge of each of said segments, the improvement which comprises the body element formed of a grained material with the grain thereof so oriented in the body element as to run substantially parallel to the longitudinal axis thereof, said body element, between said notches and from said notches to ends of the body element adjacent thereto splittable, upon application of sufficient force thereto adjacent the longitudinal edges thereof along the line of the grain, said grained material of sufficient strength as to not so split in ordinary miniature construction with the body element and of such character as to split along the grain thereof in such fashion as to permit separation of the two parts of the body element defined by such longitudinal split, whereby to leave a post-separation longitudinal edge on the element substantially parallel to the longitudinal axis of the element.

2. A stick construction unit as in claim 1 wherein the material is wood having the grain thereof running substantially parallel to the longitudinal axis of the body element.

3. A stick construction unit as in claim 1 including at least one weakened line of severance formed in said body element extending substantially parallel to the longitudinal axis of said stick and said grain and running from the base of a first notch to one of an end of the element adjacent thereto and the base of a second notch adjacent thereto.

4. A stick construction unit as in claim 1 wherein the longitudinal edges of the body element, where contacted by the weakened transverse line of severance, are inwardly formed to at least the depth of the notches on the longitudinal edge of the body element next each said inward forming.

5. A stick construction unit as in claim 1 including at least one nick notch in the base of one of said notches directed substantially parallel to the longitudinal axis of said element toward one of an adjacent end of the element and an adjacent notch base.

References Cited in the file of this patent

UNITED STATES PATENTS

| | | |
|---|---|---|
| 1,936,816 | Zitzman | Nov. 28, 1933 |
| 1,984,799 | Jacobson | Dec. 18, 1934 |
| 2,844,910 | Korchak | July 29, 1958 |